United States Patent [19]

Hein

[11] Patent Number: 5,158,271
[45] Date of Patent: Oct. 27, 1992

[54] AUTOMOTIVE POWERTRAIN MOUNT

[75] Inventor: Richard D. Hein, Wabash, Ind.

[73] Assignee: GenCorp. Inc., Fairlawn, Ohio

[21] Appl. No.: 725,362

[22] Filed: Jun. 25, 1991

Related U.S. Application Data

[63] Continuation of Ser. No. 416,183, Oct. 2, 1989, abandoned.

[51] Int. Cl.⁵ .............................................. B60G 11/22
[52] U.S. Cl. .................................. 267/281; 267/293; 267/140.4
[58] Field of Search ............... 267/140.4, 293, 276, 267/281, 141.2; 188/300, 312; 248/560, 609, 635; 16/2

[56] References Cited

U.S. PATENT DOCUMENTS

| | | | |
|---|---|---|---|
| 3,825,090 | 7/1974 | Runkle et al. | 180/300 X |
| 4,157,227 | 6/1979 | Hahle | 267/293 X |
| 4,919,400 | 4/1990 | Tabata et al. | 267/141.2 |

FOREIGN PATENT DOCUMENTS

| | | | |
|---|---|---|---|
| 0020790 | 1/1981 | European Pat. Off. | 267/141.2 |
| 0295795 | 12/1988 | European Pat. Off. | 180/312 |
| 0088039 | 5/1987 | Japan | 180/300 |
| 0188832 | 8/1987 | Japan | 267/293 |

Primary Examiner—Robert J. Oberleitner
Assistant Examiner—Lee W. Young

[57] ABSTRACT

An automotive power transmission mount is described as having resilient elastomeric springs radially disposed with a non-rigid intermediate mass which has its own spring rate and an outer member which is also of a non-rigid construction. The resilient elastomeric springs are located about a rigid, inner, hollow, metal core.

8 Claims, 1 Drawing Sheet

AUTOMOTIVE POWERTRAIN MOUNT

This application is a continuation of application Ser. No. 07/416,183, filed Oct. 2, 1989 now abandoned.

BACKGROUND OF THE INVENTION

The invention relates to mounting devices, especially those useful in automotive engine or powertrain mounts that are used to impede undesirable vibrations from reaching the passenger compartment. Elastomeric springs in series separated by "closed" geometric shapes, e.g., cylinders, squares, rectangles, etc., have been tried in similar applications but have demonstrated a lack of the required durability. This is due to the fact that all elastomers exhibit resilient curing stress when molded between two "closed" shapes, e.g., concentric cylinders. The primary method of removing these unwanted stresses would be to swage the outer and inner metals sufficiently to reduce the elastomer dimension and thus the resilient curing stress between the two closed shapes.

Briefly stated, the invention is an automotive mount which essentially comprises an open or non-rigid outer cylindrical metal shell which is radially spaced from a rigid inner hollow metal core which has a unique generally tear-shaped cross-section. At least two resilient elastomeric springs are provided between the inner core and outer shell of the mount.

An open or non-rigid parti-cylindrical metal spring is positioned between the elastomeric springs which are in series. In practice this places three springs in series; one is metal, the other two elastomeric.

$$\text{Old } K_d = \frac{1}{\frac{1}{Ke_1} + \frac{1}{Ke_2}}$$

$$\text{New } K_d = \frac{1}{\frac{1}{Ke_1} + \frac{1}{Ke_2} + \frac{1}{K_s}}$$

The non-rigid intermediate also provides a friendly interface between the two elastomeric spring members in that it tends to equalize forces between these members since it is relatively free to move radially to correct this unbalance.

The metal spring or intermediate member has strategically located metal ears or tabs which project from the spring to form a combination which possesses its own tuneable spring rate as well as supplying an additional intermediate mass to the mount. The tabs can also supply increased resistance to axial displacement. Changes in the size and shape of the tabs will result in changes in the response of the mounting. The metal spring is also provided with slots or voids which provide a tuning mechanism along with the physical dimensions, i.e., thickness, width, etc. Changes made individually or collectively in these elements result in a changed response in the mount. In other words, they may be used to tune the mount for a specific environment in multi directions.

In addition, the closure of the outer open member during assembly into a mounting bracket produces a swaging effect on the elastomeric elements without performing two swaging operations.

DESCRIPTION OF DRAWINGS

The following description of the invention will be better understood by having reference to the accompanying drawings wherein.

DETAILED DESCRIPTION OF DRAWINGS

Figure 1:
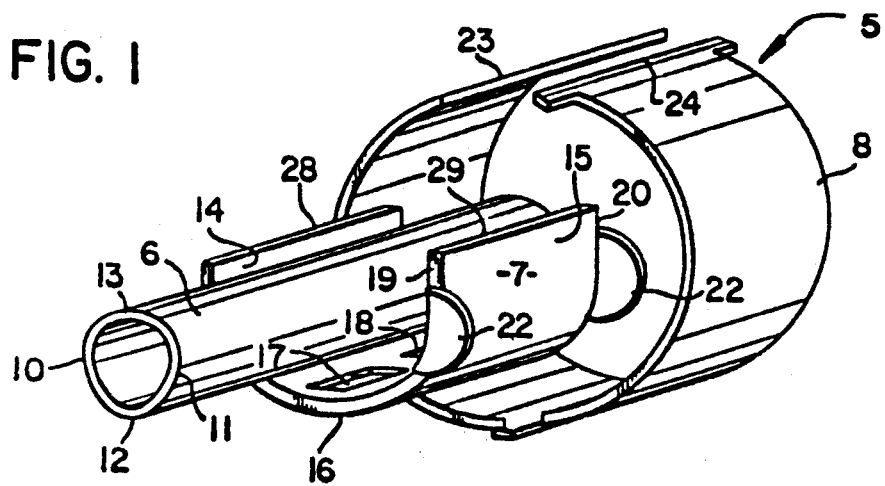
FIG. 1 is a perspective view of the metal components of the mount.

With general reference to the drawing for like parts, and particular reference to FIG. 1, there is shown an automatic powertrain mount 5 which comprises as an inner member a hollow, cylindrical inner metal core 6, a parti-cylindrical metal spring 7 which is radially spaced outwardly of the core 6 and, as an outer member an outer parti-cylindrical metal sleeve or shell 8 which is radially spaced outwardly of the spring 7, and at least two resilient elastomeric springs 9 which are positioned between the inner core 7 and outer shell 8 and in which the spring 6 is embedded. The elastomeric spring 9 oil composed of any suitable rubber which has the desired characteristics.

The core 6 has a generally tear-shaped or oval cross-section which includes a pair of converging legs 10,11 which are connected by a shorter curved web 12 and a longer curved web 13 opposite the shorter web 12. The core 6 is axially longer than any of the aforementioned components of the mount 5 to provide for axial displacement and to equalize the load/bond area of the other support members. The generally tear-shaped design of the core 6 extends the pressure angle surfaces along the outer converging legs 10,11 of the core 6 exposed to the rubber spring 9. This particular design enhances the load-carrying ability of the mount 5.

The metal spring 7 has a U-shaped cross-section which includes a pair of legs 14,15 connected by a curved web 16 in which a plurality of slots or voids 17,18 are spaced longitudinally. The spring 7 has a pair of longitudinally-spaced ends 19,20 from which a pair of semicircular ears or tabs 21,22 project radially outward towards the outer shell 7 to provide the unique features or characteristics heretofore mentioned. The spring 7 is positioned such that its web 16 confronts the shorter web 12 of the inner core 6.

Figure 3:
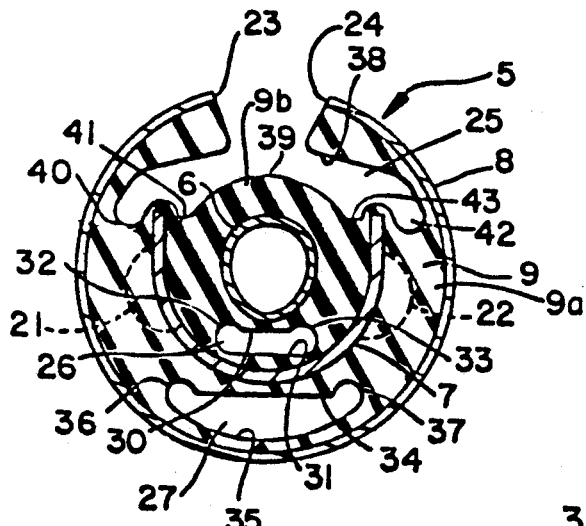
FIG. 3 is a section of the mount viewed from the line 3—3 of FIG. 2.
Figure 2:
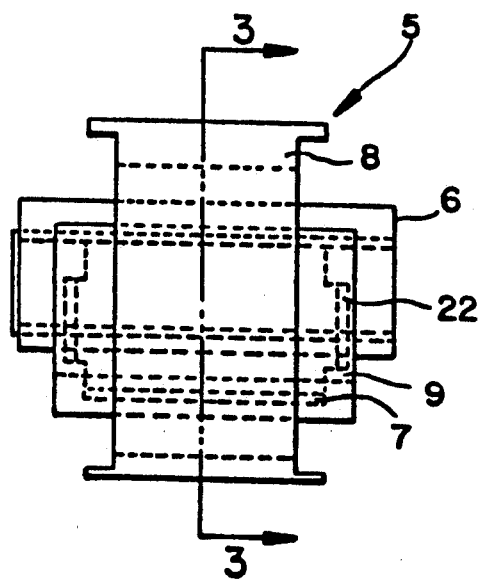
FIG. 2 is a side view of the mount.

The outer shell 8, as seen in FIGS. 1 and 3, is split longitudinally and, when assembled, has a pair of opposing spaced marginal edges 23,24 which are brought together and maintained in abutting relation. This provides a swaging action when the mount is assembled into a support bracket (not shown) and allows for pre-compression of the elastomeric springs 9 to reduce residual curing stresses. This radial stress also enhances the stability of the mount 5 relative to the bracket.

The rubber springs 9, as best seen in FIG. 3, are provided with a plurality of voids 25,26,27 which extend longitudinally of the springs 9. The largest void 25 curves around and beyond the adjacent distal marginal edges 28,29 of the spring 7 and spans the distance between the legs 14, 15 of the spring 7 and the space between the marginal edges 23, 24 of the outer shell 8, thereby leaving a thin layer of elastomeric material covering the marginal edges 28, 29 of the metal spring 7. Thus, elastomeric springs 9, comprising two elastomeric springs 9a and 9b are a pair of elastomeric springs, i.e., an inner elastomeric spring between the inner core 6 and the metal spring 7, and an outer elastomeric spring between the metal spring 7 and the outer metal shell 8, both of which springs can have differently configured voids to produce different spring rates, if desired. The other two voids 26,27 are generally parallel, the shorter void 26 being located between the core 6 and spring 7 and the longer void 27 being located between the spring 7 and outer shell 8. The shorter void 26 is defined by a pair of parallel walls 30,31 connected by bulbous-shaped walls 32,33. The longer void 27 is defined by a flat wall 34, curved wall 35 and similar connecting bulbous-shaped walls 36,37. The largest void 25, spaced on the other side of the core 6, is defined by a flat wall 38, opposing curved wall 39 and similar connecting double bulbous-shaped walls 40,41 and 42,43. The voids 25,26 help eliminate direct compression/tension stresses between the inner core 6 and the spring 7 and are extended longitudinally of the springs 9 to dissipate edge stresses The remaining void 27 between the spring 7 and outer shell 8 may be similarly viewed in respect to such stresses between the spring 7 and outer shell 8.

The specific location and configuration of the voids affect the reaction of the mount. Generally it may be said that voids in the elastomer lower the spring rate while an increase in the mass of the elastomer increases the spring rate.

By careful control of each element of the mount of the invention, it is possible to obtain a structure which has the precise attributes needed for a specific application.

In the foregoing description the cylindrical outer shell, inner hollow core and spring have been described as being fabricated from metal. While metal is preferred for many such applications, it is within the compass of the invention that these parts be of so called engineering plastics such as PEEK ® sold by ICI. The use of these latter materials is often useful when reduced weight is important.

The elastomer used in the practice of this invention is generally rubber, but other elastomers having similar characteristics may also be used.

Thus, there has been described a unique powertrain mount which utilizes an unusual parti-cylindrical spring with ears and voids to accomplish the aforementioned desired characteristics. This, coupled with the novel shaped core, provides a mount structure which is different from any known prior art mounts.

The preferred embodiment shown and described herein is merely exemplary of the invention. In the light of the foregoing description and the drawings, changes and modifications will occur to those skilled in the art without departing from the spirit and scope of the invention as defined in the claims.

What is claimed is:

1. A resilient mount for an automotive component comprising:
   a tubular rigid inner member which has a generally oval-shaped cross-section, having two different radii of curvature at the two longitudinal ends of said cross-section;
   b. a parti-cylindrical outer non-rigid member;
   c. at least two resilient elastomeric springs situated between said inner and outer members, wherein said elastomeric springs are comprised of at least a first and second elastomeric spring; and
   d. a U-shaped metal spring which has a pair of spaced marginal edges between said elastomer springs, a void which spans the space between said distal marginal edges of said metal spring and which extends beyond said edges in close proximity thereto to leave a thin layer of elastomeric material covering said edges between said first elastomeric spring between the inner member and metal spring and said second elastomeric spring between the metal spring and the outer member, and said second elastomer spring having a second void therein located between said metal spring and said outer non-rigid member, said voids being open to atmospheric pressure wherein the configuration of said voids control the spring rate of said elastomeric springs.

2. The mount of claim 1 which includes a slot in the web of the metal spring between opposing legs of the spring.

3. The mount of claim 2 which includes at least one pair of ear-shaped metal tabs extending in opposite directions from the metal spring towards the radially outermost surface.

4. The mount of claim 3 which includes a pair of tabs at opposing longitudinally-spaced ends of the metal spring.

5. The mount of claim 4 wherein the inner member includes a pair of surfaces which converge in the direction of the web of the spring.

6. A resilient mount for an automotive component comprising:
   a. a hollow inner core extending longitudinally of the mount, the core having a generally oval shaped cross-section including a pair of converging legs connected by a shorter curved web at one end and a longer curved web at an opposing end;
   b. at least a parti-cylindrical outer shell in radially spaced relation from the core;
   c. at least two resilient annular elastomeric springs disposed around the core between the inner core and outer shell, said elastomeric springs including radially-spaced voids in the elastomer, the voids extending longitudinally of said elastomeric springs;
   d. a parti-cylindrical metal spring embedded longitudinally between the elastomeric springs between the inner core and outer shell, the metal spring having a generally U-shaped cross-section and including a pair of legs radially spaced from the legs of the core and a leg connecting web which passes between two voids which are in said elastomeric springs and radially spaced from the shorter web of the core the distal marginal edges of the metal spring terminating just short of a third void spanning the space between the legs of the metal spring between the outer shell and longer web of the core, the metal spring having a pair of opposing ends; and
   e. a pair of tabs extending outwardly from the legs of the metal spring in the direction of the outer shell at the opposing ends of the metal spring.

7. The mount of claim 6 wherein each of the voids includes at least one bulbous-shaped wall at each of the opposing ends of the void when the void is viewed in cross-section.

8. A resilient mount for an automotive component, comprising:
   a. a rigid inner member having a generally oval shaped cross-section, including a pair of converging legs;

b. a non-rigid outer member which at least partially surrounds the inner member;
c. at least one elastomeric spring between the inner and outer members, the elastomeric spring including three voids which extend longitudinally thereof; and
d. a U-shaped metal spring embedded in the elastomeric spring, the metal spring having a pair of opposing legs with distal extremities, the legs being connected by a web with a slot therein, the legs having at least one pair of ear-shaped tabs which, extend outwardly therefrom towards the outer member, the tabs being at longitudinally spaced opposing ends of the metal spring, and one of said three voids spanning the space between the legs of the metal spring in spaced relation from the distal extremities of the legs, and the other two remaining voids of said three voids straddling the web of the metal spring.

* * * * *